(12) United States Patent
Spaggiari (10) Patent No.: US 8,405,269 B2
(45) Date of Patent: Mar. 26, 2013

(54) ROTOR FOR AN ELECTRICAL MACHINE

(75) Inventor: Alessandro Spaggiari, Correggio (IT)

(73) Assignee: Spal Automotive S.R.L. (IT)

( * ) Notice: Subject to any disclaimer, the term of this patent is extended or adjusted under 35 U.S.C. 154(b) by 273 days.

(21) Appl. No.: 11/922,910

(22) PCT Filed: Jun. 28, 2006

(86) PCT No.: PCT/IB2006/001764
§ 371 (c)(1), (2), (4) Date: Dec. 27, 2007

(87) PCT Pub. No.: WO2007/004009
PCT Pub. Date: Jan. 11, 2007

(65) Prior Publication Data
US 2009/0115279 A1     May 7, 2009

(30) Foreign Application Priority Data
Jun. 30, 2005   (IT) .............................. BO2005A0437

(51) Int. Cl.
*H02K 21/12* (2006.01)
(52) U.S. Cl. .............................. 310/156.53; 310/156.45
(58) Field of Classification Search ............. 310/156.01, 310/156.08, 156.16–156.17, 156.24, 156.56, 310/156.53, 156.22, 262.1–262.2, 156.45
See application file for complete search history.

(56) References Cited

U.S. PATENT DOCUMENTS

| | | | |
|---|---|---|---|
| 3,445,700 A | 5/1969 | Prange et al. | |
| 5,369,325 A * | 11/1994 | Nagate et al. | 310/156.54 |
| 5,581,140 A | 12/1996 | Futami et al. | |
| 5,679,995 A * | 10/1997 | Nagate et al. | 310/156.54 |
| 5,936,323 A * | 8/1999 | Shibukawa et al. | 310/156.53 |
| 6,141,856 A * | 11/2000 | Johnson et al. | 29/598 |
| 6,225,724 B1 | 5/2001 | Toide et al. | |
| 6,300,700 B1 * | 10/2001 | Nishiyama et al. | 310/156.45 |
| 6,703,745 B2 * | 3/2004 | Chu | 310/156.45 |
| 6,794,784 B2 * | 9/2004 | Takahashi et al. | 310/156.56 |
| 6,867,526 B2 * | 3/2005 | Mori et al. | 310/156.57 |
| 6,917,137 B2 * | 7/2005 | Okamoto et al. | 310/261.1 |
| 7,474,027 B2 * | 1/2009 | Kikuchi et al. | 310/156.53 |
| 2002/0171309 A1 * | 11/2002 | Wakui et al. | 310/156.48 |

(Continued)

FOREIGN PATENT DOCUMENTS

| | | |
|---|---|---|
| EP | 1 014 542 | 6/2000 |
| JP | 05083892 A * | 1/1993 |

(Continued)

OTHER PUBLICATIONS

Nagate et al, JP05083892A Machine Translation, Apr. 1993.*

(Continued)

*Primary Examiner* — Tran Nguyen
*Assistant Examiner* — Eric Johnson
(74) *Attorney, Agent, or Firm* — Timothy J. Klima; Shuttleworth & Ingersoll, PLC (57) ABSTRACT

A rotor (1) for an electric motor with permanent magnets (10) has a principal axis (D), comprises a laminated core (2) delimited by a first and a second end wall (4, 5) and by a lateral surface (6) and has a hole (7) for coupling to a motor shaft (8) and a plurality of longitudinal slots (9) for housing the magnets (10); the rotor also comprises positioning devices (20) for stabilizing the magnets (10) in the slots (9).

17 Claims, 8 Drawing Sheets

U.S. PATENT DOCUMENTS

| | | | |
|---|---|---|---|
| 2003/0218399 A1* | 11/2003 | Iles-Klumpner | 310/156.53 |
| 2004/0178693 A1* | 9/2004 | Burgbacher | 310/217 |
| 2004/0217666 A1* | 11/2004 | Mellor et al. | 310/156.53 |
| 2004/0256940 A1* | 12/2004 | Tsuruta et al. | 310/156.53 |

FOREIGN PATENT DOCUMENTS

| | | | |
|---|---|---|---|
| JP | 05083892 A * | 4/1993 | |
| JP | 2000175388 | 6/2000 | |
| JP | 2000341920 | 12/2000 | |
| JP | 2001069701 A * | 3/2001 | |
| JP | 2002247784 A * | 8/2002 | |
| JP | 2002369424 A * | 12/2002 | |
| JP | 2004357418 | 12/2004 | |
| WO | 02/39565 | 5/2002 | |

OTHER PUBLICATIONS

Akeda et al, JP 2001069701A Machine Translation, Mar. 2001.*

Kojima et al., JP2002369424A Machine Translation, Dec. 2002.*

* cited by examiner

ROTOR FOR AN ELECTRICAL MACHINE

TECHNICAL FIELD

This invention relates to a rotor for an electrical machine and, in particular, a rotor having permanent embedded magnets, that is, magnets that are seated in slots made in the rotor itself.

BACKGROUND ART

Embedded magnet rotors of known type, used especially in brushless motors, usually consist of a laminated core, that is to say, a core made up of a plurality of thin metal laminations and having a principal axis that coincides with the axis of rotation of the motor.

The rotor normally has a plurality of longitudinal slots, parallel to the principal axis, and a central hole or opening, also parallel to the principal axis, for accommodating the magnets and a drive shaft, respectively.

The rotor is mounted in a stator equipped with magnetic poles which, when powered, generate a magnetic field that interacts with the magnets and causes the rotor to turn.

One disadvantage of motors that use rotors of this kind is due to the magnetic attraction between the magnets in the rotor and the poles on the stator giving rise to what is commonly referred to as "cogging torque" or "detent torque"

Cogging torque causes non-uniformity in the angular speed of the rotor, which tends to rotate in a series of small "jerky" movements instead of smoothly and continuously.

Embedded magnet rotors are also difficult to balance and assemble, especially when the magnets are inserted into the longitudinal slots.

The inside dimensions of the slots are slightly larger than the outside dimensions of the magnets so that the latter can be inserted into the slots.

The result is that in prior art rotors, however small these dimensional differences between slots and magnets may be, the magnets are not held firmly in place and the centrifugal force created by the rotational motion pushes them against the radially outermost wall of the slot.

That means the weight distribution and air gap shape when the rotor is at rest differ from the weight distribution and air gap shape when it is rotating.

In other words, the position of the magnets relative to the rotor core changes when the motor is started, making it very difficult to optimise flows and geometry in the motor design.

Optimisation of geometry is also made more difficult by concentricity errors in the different sheets making up the rotor due to the fact that the sheets are cut at different times. These errors cause rotor unbalance.

DISCLOSURE OF THE INVENTION

In this context, the main purpose of the present invention is to propose an embedded magnet rotor which is easy to assemble and in which the position of the magnets when the rotor is at rest does not change when the motor is switched on and the rotor starts turning.

Another aim of the invention is to provide a rotor with a balanced weight distribution under both static and rotating conditions.

Yet another aim of the invention is to provide a rotor, especially for brushless motors, that reduces cogging torque during motor operation.

The above mentioned purpose and aims are substantially achieved by a rotor for an electrical machine having the characteristics defined in the present description.

DESCRIPTION OF THE DRAWINGS

Further features and advantages of the present invention are more apparent in the detailed description below, with reference to a preferred, non-limiting, embodiment of a rotor for an electrical machine, as illustrated in the accompanying drawings, in which.

DESCRIPTION OF THE PREFERRED EMBODIMENTS OF THE INVENTION

With reference to the accompanying drawings, the numeral 1 denotes a rotor, according to the present invention, for an electric motor M.

Figure 4:
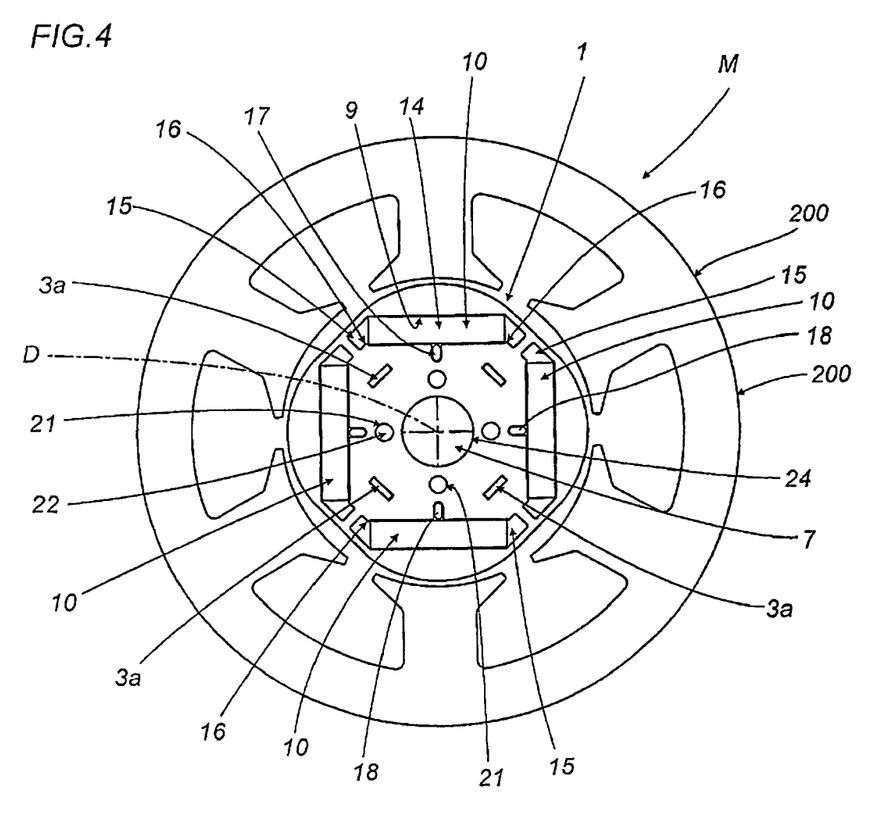
FIG. 4 is a schematic front view, with some parts cut away to better illustrate others, of the rotor shown in the drawings listed above.
Figure 6:
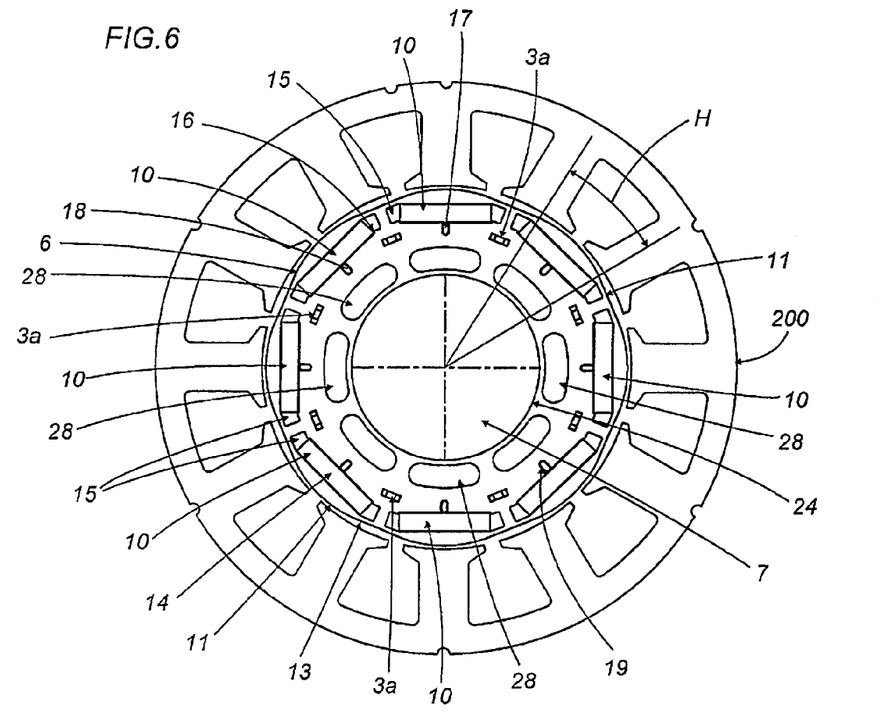
FIG. 6 is a schematic front view, with some parts cut away in order to better illustrate others, of an eight-pole motor equipped with a rotor according to the invention.

As shown in FIGS. 4 and 6, the motor M comprises a stator 200 which accommodates the rotor 1.

The rotor 1 has a principal axis of rotation D, normally coinciding with the axis of the motor M, and comprises a laminated core 2, that is to say, consisting of a plurality of thin laminations 3 firmly joined to each other by bonding elements 3a (assembled according to what is known as "stacking technology") delimited by a first and a second end wall 4, 5 and by a lateral surface 6.

The core 2 has a longitudinal hole 7, whose axis substantially coincides with the principal axis D, for coupling with a motor shaft 8.

The first and second end walls 4, 5 are preferably parallel with each other. To guarantee this parallelism, the laminations 3 are grouped together in stacks which are bonded to form the laminated core 2.

Advantageously, each stack is rotated relative to the adjacent stack, not only to maintain the parallelism of the end walls 4, 5 but also to correct the stacking factor which is altered when the laminations 3 are cut.

The purpose of stacking factor correction is to keep resistance constant along the entire laminated core 2.

Figure 1:
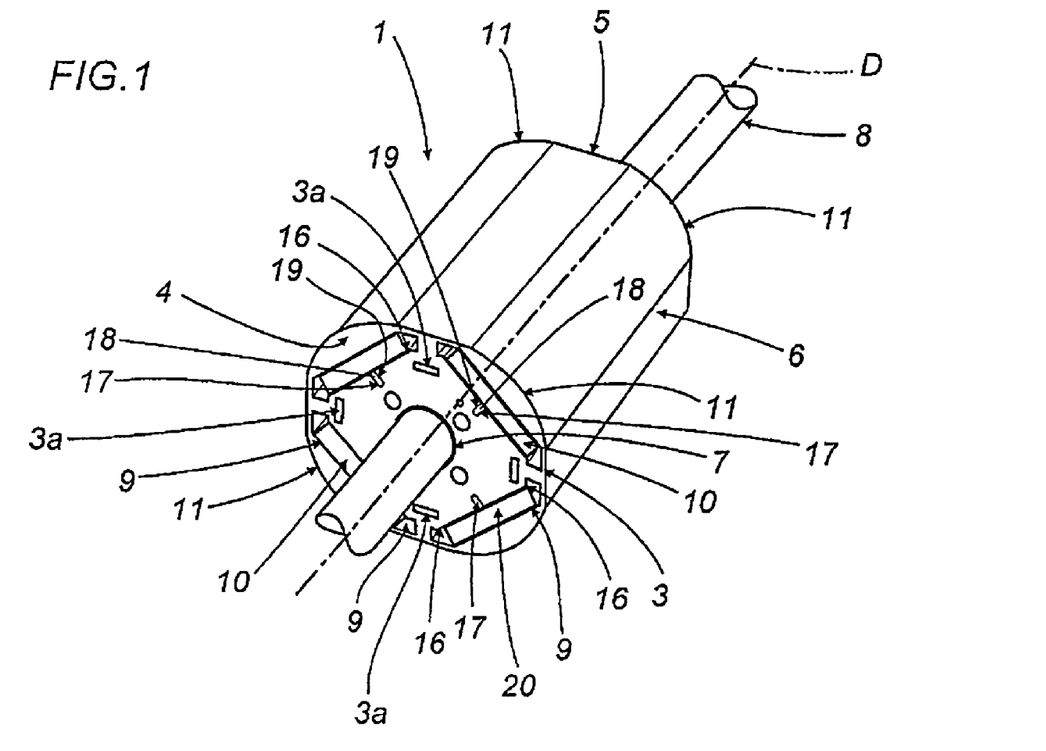
FIG. 1 is a schematic perspective view of a four-pole rotor according to the present invention.
Figure 2:
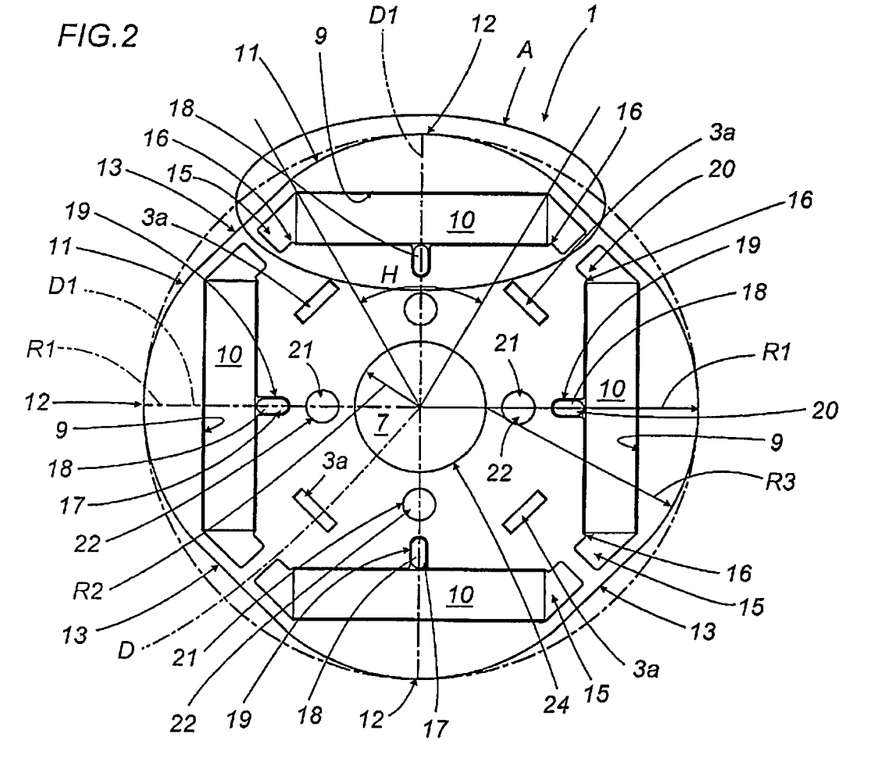
FIG. 2 illustrates the rotor of FIG. 1 in a schematic front view with some parts cut away in order to better illustrate others.

As shown in FIGS. 1 and 2, illustrating a four-pole rotor 1, the core 2 also has four longitudinal slots 9, each housing a respective magnet 10.

Preferably, each magnet 10 has a predetermined weight so as to make it easier to balance the rotor 1.

Advantageously, in alternative embodiments that are not illustrated, the magnets 10 are longer or shorter than the respective slots 9 so as to optimise or maximise the magnetic field.

Figure 3:
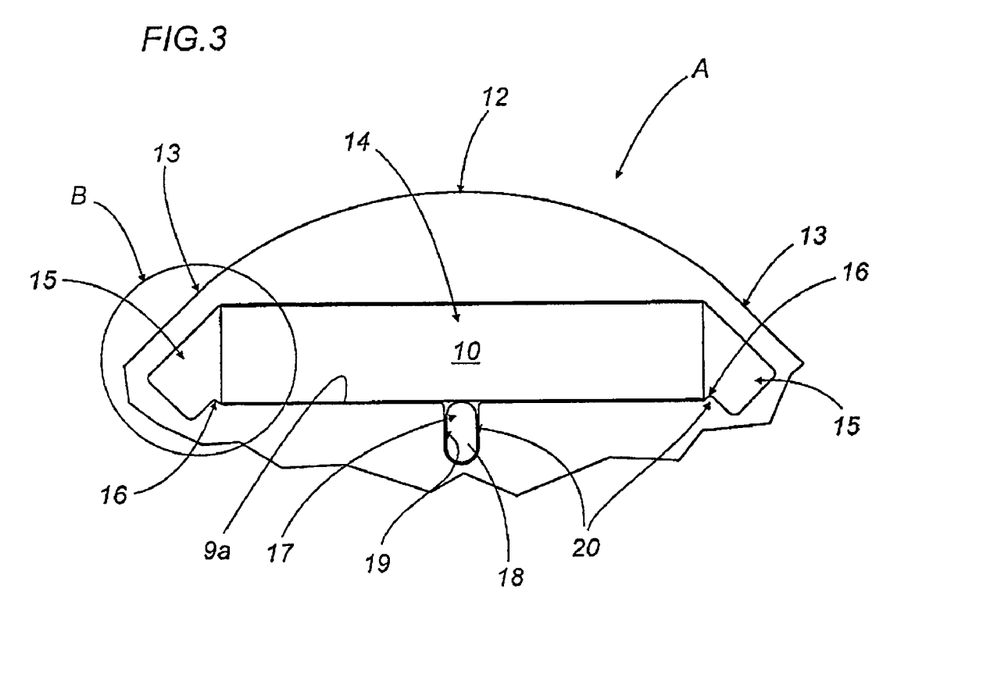
FIG. 3 illustrates the detail A from FIG. 2 in a schematic scaled-up front view with some parts cut away in order to better illustrate others.

As shown in FIG. 3, each slot 9 has a central zone 14 for accommodating the respective magnet 10 and a pair of shaped end portions 15 which are suitably angled with respect to the central zone 14.

As is known, these end portions 15 are empty and are used, in particular, to prevent closure of the leakage flux created by the magnet 10 housed in the slot 9.

At the end portions 15, each slot 9 has ribs 16 for guiding each magnet 10 in the respective slot 9.

The magnet 10 abuts against the ribs 16 in such a way as to prevent the magnet 10 itself from moving sideways in the slot 9.

Figure 3A:
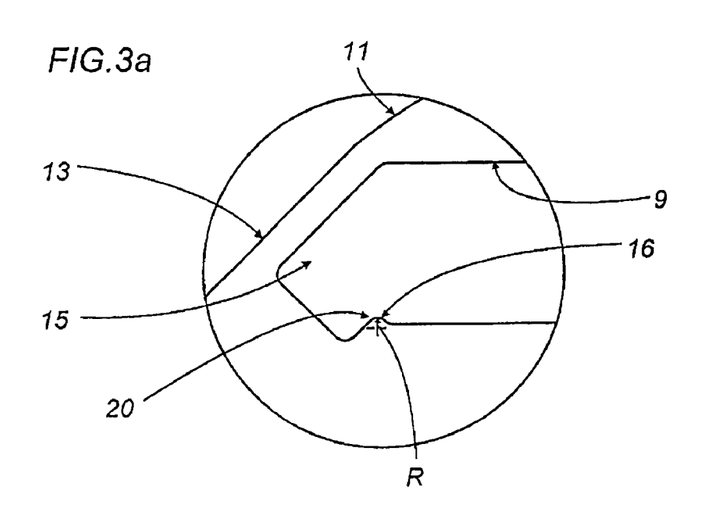
FIG. 3a illustrates the detail B from FIG. 3 in a schematic scaled-up front view.
Figure 10:
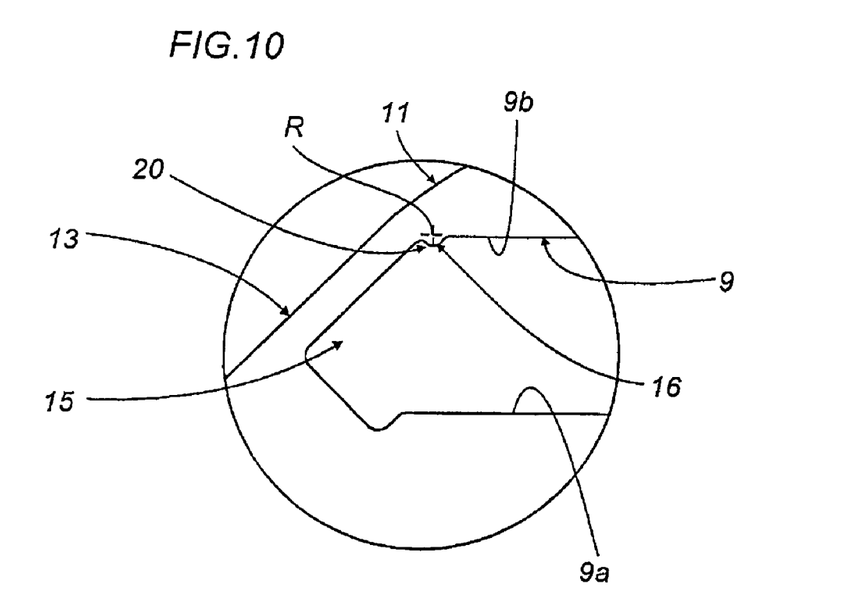
FIG. 10 shows a detail of another embodiment of a rotor according to the invention.

As illustrated in FIGS. 3a and 10, the ribs 16 are made respectively in a radially inside wall 9a of the slot 9 and in a radially outside wall 9b.

It should be noticed that, in the preferred embodiment illustrated, the ribs 16 have a circular profile of radius R.

The lateral surface 6 of the core 2 is defined by a plurality of circular arcs 11 connected to each other and, more specifically, in the case of a four-pole rotor 1, the lateral surface of each lamination 3 is defined by four arcs 11 of radius R3.

Looking in more detail at a single lamination 3 for simplicity of description, the tops 12 of the arcs 11 are located at an equal distance R1 from the axis D and each is positioned along an axis D1 that is substantially perpendicular to the principal axis D and passes through the centre line of a respective longitudinal slot 9.

Basically, each arc 11 is positioned at a respective slot 9 and adjacent arcs 11 are joined by a straight segment 13.

The single lamination 3 (and, consequently, the core 2) has the shape of a polygon with rounded corners.

The centres of the arcs 11 are at an equal distance R2 from the axis D.

As illustrated in particular in FIG. 2, the centres of the arcs 11 are positioned substantially at an internal edge 24 of the longitudinal hole 7 so as to optimise the magnetic flux distribution through the air gap, as described in more detail below.

By way of example and without restricting the scope of the invention, each arc 11 in the 4-pole rotor preferred embodiment subtends an angle H of between approximately 55° and approximately 65°, measured with reference to the principal axis D. More specifically, the angle H subtended by the arcs 11 in the preferred embodiment is approximately 60°.

Figure 5:
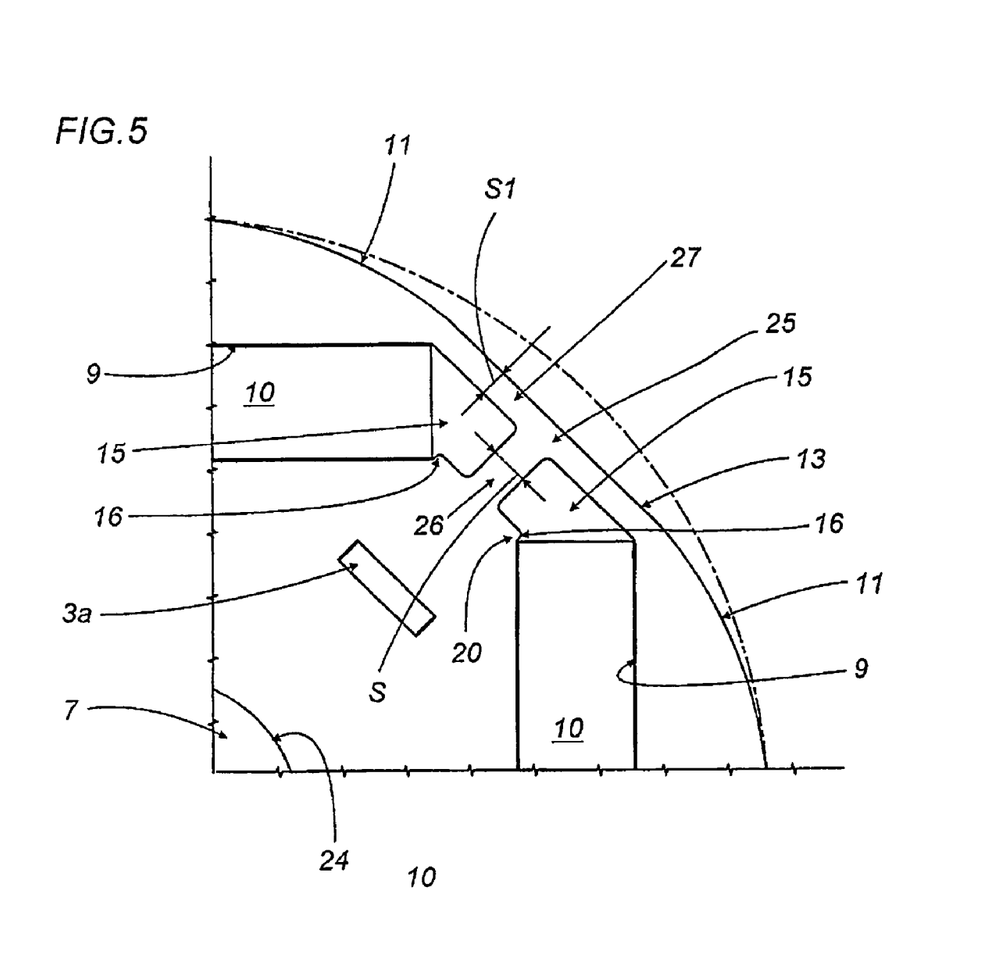
FIG. 5 illustrates a part of the rotor of FIG. 2 in a schematic scaled-up front view.

As illustrated in FIG. 5, the core 2 of the rotor 1 has a series of substantially T-shaped portions or zones 25.

The zones 25 are delimited by the above mentioned connecting segments 13 and by the profile of the end portions 15 of the contiguous slots 9.

Each zone 25 has a leg 26 of width S extending in a substantially radial direction along the axis D1 and a bridge 27, of width S1, joining two consecutive arcs 11 and extending in a direction substantially perpendicular to the leg 26.

Figure 3B:
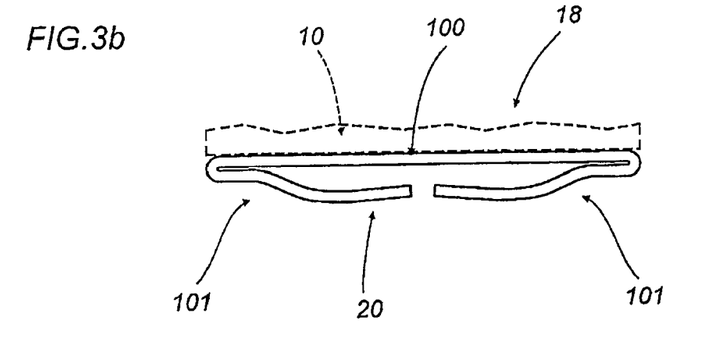
FIG. 3b is a schematic side view of an elastic element forming part of the rotor according to the invention.

As illustrated in particular in FIGS. 3 and 3b, the rotor 1 comprises elastic retaining means 17 for keeping the magnet 10 in the slot 9 and preventing it from moving radially during operation of the motor M.

The means 17 comprise an elastic element 18 positioned between the magnet 10 and the core 2.

The elastic element 18 consists preferably of a flexural spring (leaf spring). The spring 18 has a substantially straight portion 100 on which the respective magnet 10 rests.

Preferably, the portion 100 extends for the full length of the respective slot 9 and the corresponding magnet 10 is supported along its full length by the portion 100.

The spring 18 also has a pair of suitably curved side portions 101 abutting against the core 2.

Each spring 18 is inserted lengthways into the rotor 1, in particular in a groove 19 extending in a direction parallel to the axis D and located half way along the respective slot 9.

Each spring 18 pushes the respective magnet 10 in the aforementioned radial direction D1 towards the edge of the rotor 1.

It should be noticed that the springs 18 oppose the magnetic forces of attraction and repulsion acting on the magnets 10 and due to the operation of the motor M and thus prevent the magnets 10 from moving inside the respective slots 9.

Thus, there are no changes in either magnetic or weight distribution in the rotor 1 when it changes from a static to an operating configuration. The magnets remain positioned against the radially outermost wall of the slot when the rotor is stopped and when it rotates.

The elastic retaining means 17 and the guide ribs 16 thus constitute means 20 for positioning the magnets 10 in the slots 9 and are designed not only to facilitate insertion of the magnets into the slots but also to keep them in the same radial position during the operation of the motor.

Figure 9:
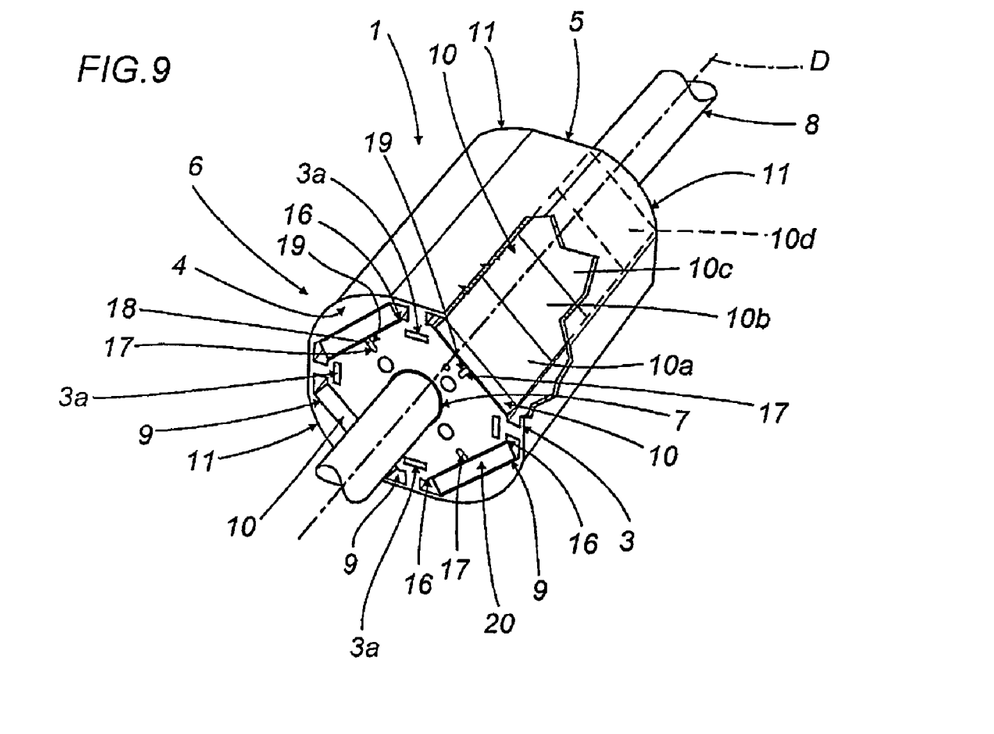
FIG. 9 illustrates a second embodiment of a four-pole rotor according to the invention in a schematic perspective view.

Notice that in the preferred embodiment illustrated in FIG. 9, the magnets 10 consist of a plurality of portions 10a, 10b, 10c, 10d housed side by side in the respective slot 9.

This solution advantageously reduces losses due to eddy currents in the rotor. In this case, the spring 18, not illustrated, is suitably shaped to push all the portions 10a, 10b, 10c, 10d in a substantially radial direction and to keep them in the right position.

Advantageously, in other embodiments which are not illustrated each magnet 10 consists of any number of portions, according to need.

The rotor 1 also has a series of longitudinal balancing holes 21.

The holes 21 are preferably filled with suitable balancing weights 22 used to compensate for imbalances caused by differences in the magnets 10 in the same rotor.

The weights 22 for balancing the rotor are also useful in cases where the individual laminations 3 are not precisely concentric.

In the preferred embodiment of the rotor with 4 poles described by way of example, the arcs 11 of the rotor 1 have a radius R3 measuring between approximately 12 mm and approximately 15 mm, and specifically, measuring approximately 13.1 mm.

The magnets 10 are between approximately 30 mm and approximately 50 mm in length L1, between approximately 14 mm and approximately 16 mm in width L2 and between approximately 2.5 mm and approximately 3.5 mm in height L3.

Specifically, the magnets 10 are approximately 40 mm in length L1, approximately 15.4 mm in width L2 and approximately 3 mm in height L3.

The radius R of the ribs 16 measures between approximately 0.1 mm and approximately 0.5 mm in length, and specifically, the radius R measures approximately 0.2 mm.

Thus, the ribs 16 are low compared to the magnet 10 so as to prevent short circuiting the latter.

The thickness S of the leg 26 is between approximately 0.8 mm and approximately 2.2 mm, and specifically, is approximately 2 mm, whilst the thickness S1 of the bridge 27 is between approximately 0.5 mm and approximately 0.8 mm, and is preferably approximately 0.6 mm.

Figure 7:
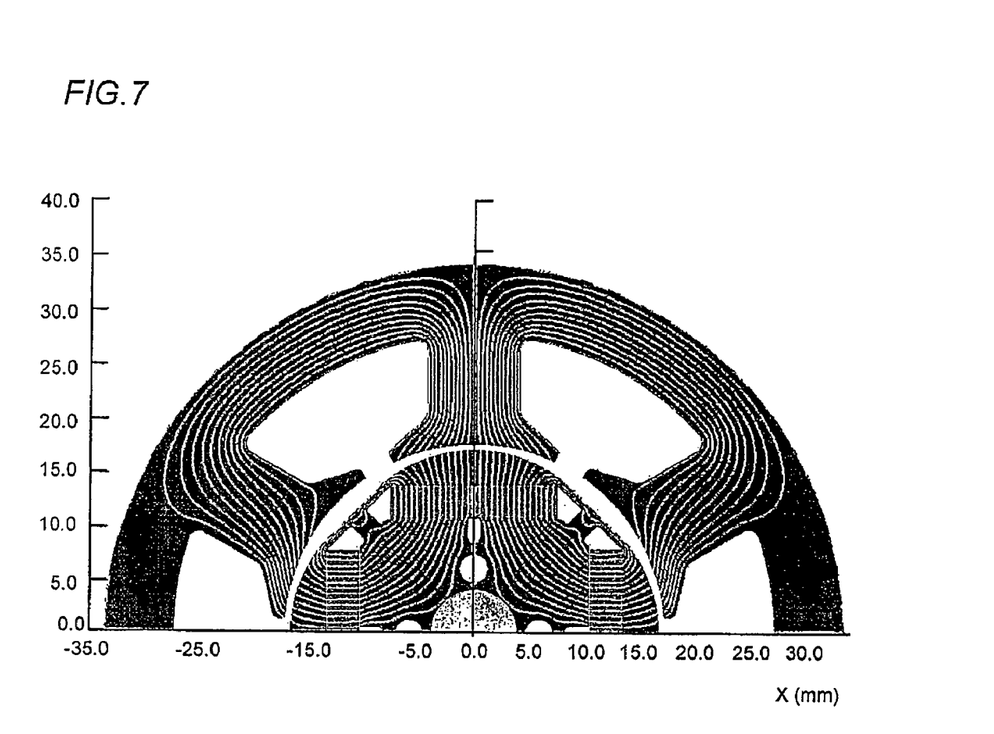
FIG. 7 illustrates the magnetic flux pattern in a preferred embodiment of an electric motor equipped with the rotor according to the invention.
Figure 8:
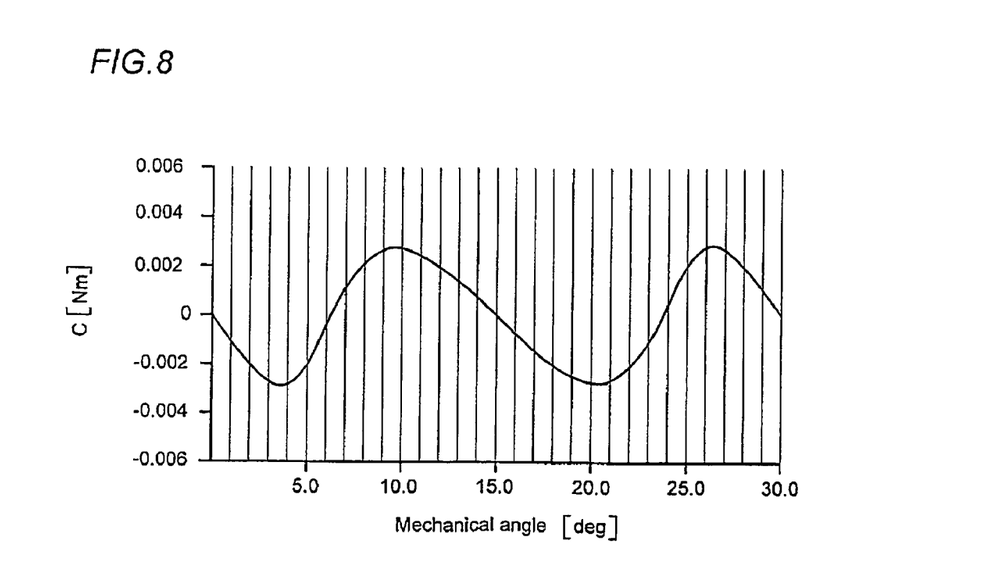
FIG. 8 shows the curve representing the cogging torque in the motor of FIG. 7.

As shown in FIGS. 7 and 8, the motor M equipped with the rotor 1 described herein has practically no flux leakage and its cogging torque curve is substantially sinusoidal and has relatively low maximum values.

In the case of a motor M with an 8-pole rotor, as shown in FIG. 6, the preferred distance R2, that is, the common distance between the principal axis D and the centres of the arcs 11 defining the lateral surface 6 is equal to approximately one third of the distance R1 between the tops of the arcs 11 and the principal axis D.

Each arc 11 subtends an angle H of approximately 30 degrees and the rotor 1 has ventilation holes 28.

Preferably, in alternative embodiments, the distance R2, that is, the common distance between the principal axis D and the centres of the arcs 11 defining the lateral surface 6 is equal to approximately one half of the distance R1 between the tops of the arcs 11 and the principal axis D.

The invention brings important advantages.

The positioning means 20 guarantee optimum rotor balance since the weight distribution does not change significantly when the rotor changes from a static to a dynamic configuration.

The stable position of the magnets enables rotor geometry to be optimised to achieve good flux distribution through the air gap and a significant reduction of the cogging torque.

The invention described has evident industrial applications and can be modified and adapted in several ways without thereby departing from the scope of the inventive concept. Moreover, all the details of the invention may be substituted by technically equivalent elements.

The invention claimed is:

1. A rotor for an electric motor with permanent magnets, said rotor having a principal axis (D), the rotor comprising:
   a laminated core delimited by a first and a second end wall and by a lateral surface and having a hole for coupling to a motor shaft and a plurality of longitudinal slots for housing the magnets;
   guide ribs in each of the slots for guiding the magnets in the slots; and
   a flexural spring positioned between each magnet and the respective slot for stabilizing the magnets in the slots, wherein:
   the core has a groove for each flexural spring,
   the groove extends in a direction parallel to the principal axis (D) between the first and second end walls,
   each spring is inserted lengthways in the groove, and
   each groove is located at the midpoint of the respective slot, perpendicular to the respective slot;
   wherein each slot has two end portions, one each on opposite ends of the slot, each end portion extending outward from the slot beyond one of the guide ribs;
   wherein the lateral surface includes a plurality of straight portions, with each straight portion positioned radially outwardly of adjacent end portions of adjacent slots;
   wherein radially inner edges and radially outer edges of adjacent end portions of adjacent slots, respectively, extend directly toward each other, and both the radially inner edges and the radially outer edges of the adjacent end portions are parallel to each other and also parallel to an adjacent straight portion of the lateral surface;
   the laminated core further comprising a plurality of rectangular bonding elements for joining together laminations of the laminated core, each rectangular bonding element positioned radially inwardly of a pair of adjacent end portions and having radially inner and outer edges being parallel to the radially inner and outer edges of the adjacent end portions;
   wherein the lateral surface is defined by a plurality of connected arcs each positioned at one of the longitudinal slots, the arcs having respective mid-points located at an equal distance (R1) from the principal axis (D) and centers positioned substantially at an internal edge of the hole.

2. The rotor according to claim 1, wherein the flexural spring operates in a direction (D1) that is substantially radial to the principal axis (D).

3. The rotor according to claim 1, wherein the ribs have a circular profile of radius (R) measuring between approximately 0.1 mm and approximately 0.5 mm.

4. The rotor according to claim 3, wherein the radius (R) measures approximately 0.2 mm.

5. The rotor according to claim 1, further comprising balancing holes that extend between the first and second end surfaces and are substantially parallel to the principal axis (D).

6. The rotor according to claim 5, further comprising balancing weights placed inside the holes.

7. The rotor according claim 1, wherein the rotor is a 4-pole rotor.

8. The rotor according to claim 7, wherein the arcs subtend an angle (H) of between approximately 55° and approximately 65° from the principal axis.

9. The rotor according to claim 8, wherein the arcs subtend an angle (H) of approximately 60° from the principal axis.

10. The rotor according to claim 8, wherein the arcs have a radius (R3) measuring between approximately 12 mm and approximately 15 mm, the magnets being between approximately 30 mm and approximately 50 mm in length (L1), between approximately 14 mm and approximately 16 mm in width (L2) and between approximately 2.5 mm and approximately 3.5 mm in height (L3).

11. The rotor according to claim 10, wherein the arcs have a radius (R3) measuring approximately 13.1 mm, the magnets being approximately 40 mm in length (L1), approximately 15.4 mm in width (L2) and approximately 3 mm in height (L3).

12. The rotor according to claim 1, wherein the the rotor is an 8-pole rotor.

13. The rotor according to claim 12, wherein the arcs subtend an angle (H) of between approximately 25° and approximately 35° from the principal axis.

14. The rotor according to claim 13, wherein the arcs subtend an angle (H) of approximately 30° from the principal axis.

15. The rotor according to claim 1, wherein the magnets consist of a plurality of portions housed side by side in the respective slot.

16. The rotor according to claim 1, wherein each of the magnets has a predetermined weight.

17. The rotor according to claim 1, wherein the first and second end walls are substantially parallel with each other, the laminated core comprising a plurality of laminations that are at least partially rotated relative to each other about the principal axis (D).

* * * * *